US 7,039,949 B2

(12) United States Patent
Cartmell et al.

(10) Patent No.: US 7,039,949 B2
(45) Date of Patent: May 2, 2006

(54) METHOD AND SYSTEM FOR BLOCKING UNWANTED COMMUNICATIONS

(76) Inventors: Brian Ross Cartmell, 9714 23rd Ave. NW., Seattle, WA (US) 98117; Cameron Scott Elliott, 1629 Harvard Ave., #103, Seattle, WA (US) 98122

( * ) Notice: Subject to any disclaimer, the term of this patent is extended or adjusted under 35 U.S.C. 154(b) by 781 days.

(21) Appl. No.: 10/016,477

(22) Filed: Dec. 10, 2001

(65) Prior Publication Data

US 2003/0110400 A1    Jun. 12, 2003

(51) Int. Cl.
*G06F 17/00* (2006.01)
(52) U.S. Cl. .................................. 726/6; 726/5; 726/3
(58) Field of Classification Search ................ 713/201, 713/183, 47, 46, 934; 709/206, 202, 203, 709/204; 726/6, 5, 3
See application file for complete search history.

(56) References Cited

U.S. PATENT DOCUMENTS

| 5,604,792 | A * | 2/1997 | Solomon et al. | ......... | 379/88.23 |
| 6,199,102 | B1 * | 3/2001 | Cobb | .......................... | 709/206 |
| 6,691,156 | B1 * | 2/2004 | Drummond et al. | ........ | 709/206 |
| 6,868,498 | B1 * | 3/2005 | Katsikas | ...................... | 713/201 |

OTHER PUBLICATIONS

Sorkin, D., "Technical and Legal Approaches to Unsolicited Electronic Email," 35 U.S.F. L. Rev. 325, Apr. 2001, pp. 325-330 and 347-354.*

Habraken, "Lesson 9, Creating Email," Teach Yourself Microsoft Outlook 98 in 10 minutes, Sams Publishing, Apr. 1998, pp. 1-5.*
Wikipedia, "Letter," Encyclopedia, available at http://en.wikipedia.org/wiki/Letter, p. 1.*
Angwin, J., "Postal Service to deliver the e-mail," The Wall Street Journal Online, Jul. 30, 2000, pp. 1-7.*
Automatic access controls in the Defense Message System (DMS); Dzierzawski, D.; Military Communications Conference Proceedings, 1999. MILCOM 1999. IEEE vol. 2, Oct. 31-Nov. 3, 1999 Page(s):1262-1266 vol. 2.*

(Continued)

*Primary Examiner*—David Jung
(74) *Attorney, Agent, or Firm*—Newman & Newman Attorneys at Law, LLP

(57) ABSTRACT

A method and system for authorizing communications sent from a sender to a recipient. The authorization system receives a communication sent from a sender to a recipient. The authorization system determines whether that sender is authorized to send communications to that recipient. If the authorization system determines that the sender is not authorized, then the authorization system sends an authorization communication to the sender. The authorization communication requests authorization information from the sender. When the authorization system receives the authorization information, it determines whether the information is correct. If correct, then the authorization system indicates that the sender is authorized and forwards the communication to the recipient. When a subsequent communication sent from the sender to the recipient is received, the authorization system may automatically determine that the sender is authorized and forward the communication to the recipient without re-contacting the sender.

63 Claims, 14 Drawing Sheets

OTHER PUBLICATIONS

Establishing a secure multicast group for remote software delivery; Lin Han et al.; Enabling Technologies: Infrastructure for Collaborative Enterprises, Proceedings. IEEE 8th International Workshops on Jun. 16-18, 1999 Page(s):194-195.*

Authorization in the digital library: secure access to services across enterprise boundaries; Ching et al.; Research and Technology Advances in Digital Libraries, Proceedings of the Third Forum on May 13-15, 1996 Page(s) 110-119.*

* cited by examiner

600 www.emailauthorize.com/...

Congratulations!

Your e-mail is being forwarded to _____ and future e-mails from you will automatically be forwarded to _____ without this verification process.

It is easy to sign up for the authorization service,

700 www.emailauthorize.com/...

Sign up for the Authorize Service

Enter:

E-mail Name: _____@emailauthorize.com

Password: _____

Submit

*Fig. 7*

METHOD AND SYSTEM FOR BLOCKING UNWANTED COMMUNICATIONS

BACKGROUND

Electronic communications such as e-mail are being increasingly used for both business and personal uses. Electronic communications has many advantages over non-electronic communications such as postal mail. These advantages include low cost, rapid delivery, ease of storage, and so on. As a result of these advantages, there is also an important disadvantage of electronic communications: junk mail, spam, and other types of unwanted electronic communications. Because of its low cost and speed, many organizations use electronic communications to advertise. For example, a mortgage company may purchase a list of e-mail addresses and send an e-mail message containing an advertisement for the mortgage company to each e-mail address. It is not uncommon for a person to receive many such unwanted and unsolicited e-mail messages a day. People receiving such junk e-mail messages typically find them annoying. Junk e-mail messages may also cause a person's inbox to become full and may make it difficult to locate and identify non-junk e-mail messages.

Various techniques have been developed to combat junk e-mail. For example, some e-mail systems allow a user to create a list of junk e-mail senders. When an e-mail message is received from a sender on the list of junk e-mail senders, the e-mail system may automatically delete the junk e-mail message or may automatically store the junk e-mail message in a special folder. When a junk e-mail message is received from a sender who is not currently on the junk e-mail list, the recipient can indicate to add that sender to the list. As another example, some e-mail systems may allow the recipient to specify a list of non-junk senders. If an e-mail message is received from a sender who is not on the list of non-junk senders, then the e-mail system may automatically delete or otherwise specially handle such an e-mail message.

A disadvantage of these techniques for combating junk e-mail is that the recipients are responsible for specifying who is a junk sender and a non-junk sender. It would be desirable to have a technique for combating junk e-mail that relieves the recipient of such responsibility.

BRIEF DESCRIPTION OF THE DRAWINGS

FIG. 6 illustrates a web page notifying the sender that they have been authorized.

FIG. 7 illustrates a web page for signing up for the authorization service.

DETAILED DESCRIPTION

Figure 1:
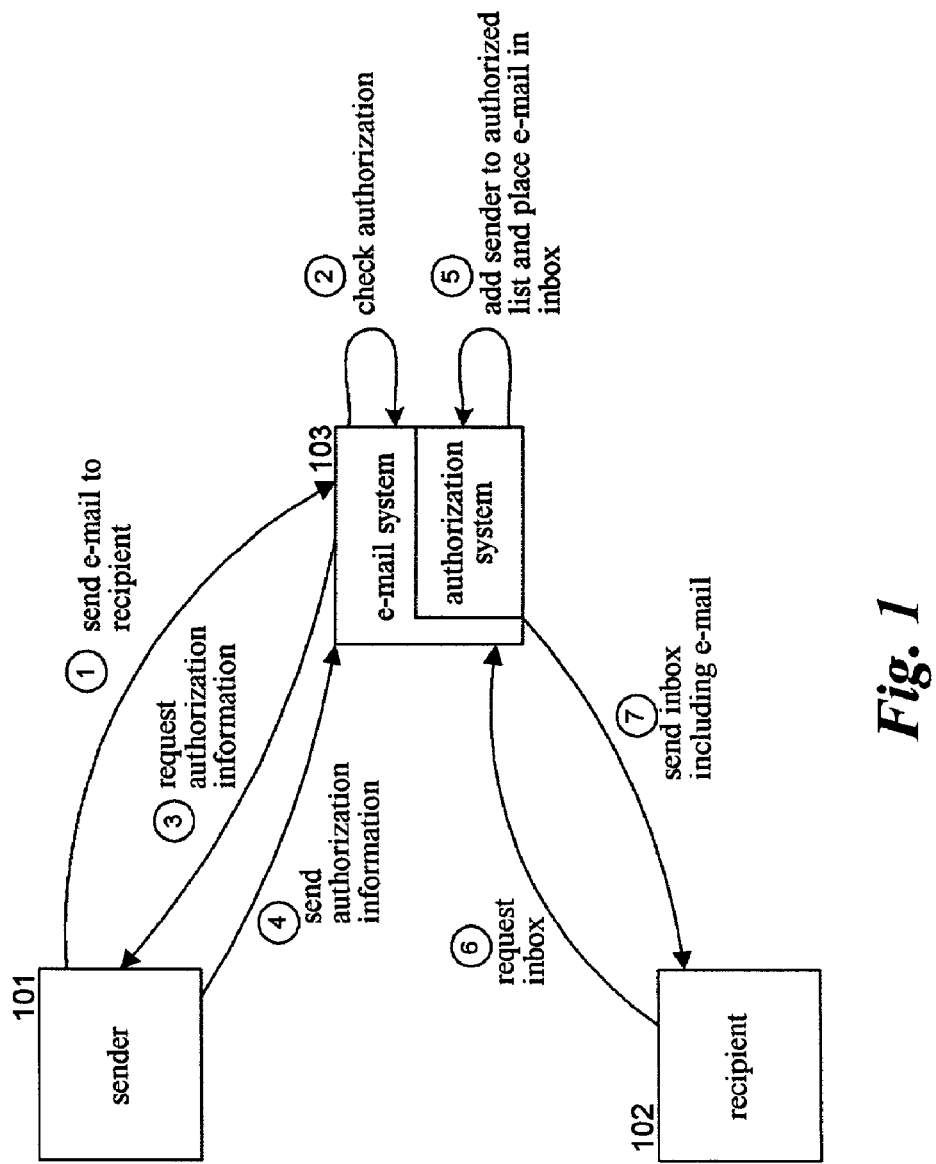
FIG. 1 is a block diagram illustrating a configuration of the authorization system implemented as part of an e-mail system.

A method and system for authorizing communications sent from a sender to a recipient is provided. In one embodiment, the authorization system receives a communication (e.g., e-mail message or voice mail message) sent from a sender to a recipient. The authorization system determines whether that sender is authorized to send communications to that recipient. The authorization system may make this determination based on a list of senders who are authorized to send to that recipient. When the authorization system determines that sender is authorized, the authorization system provides the communication to the recipient. If the authorization system determines that the sender is, however, not authorized, then the authorization system sends an authorization communication to the sender. The authorization communication requests authorization information from the sender. In one embodiment, the request may be for authorization information that is difficult for a computer system to automatically provide, but is easy for a person to provide. For example, the request may be that the sender respond with the number of words in the first sentence of the request, the color of a cloud, or the name of the current U.S. President. In addition, the authorization system may request many different types of authorization information to make it even more difficult for a computer system to respond correctly. One skilled in the art will appreciate that many of the well-known techniques for determining whether a respondent is a person or computer may alternatively be used. When the authorization system receives the authorization information, it determines whether the information is correct, that is whether it was provided by a person or a computer. If correct, then the authorization system indicates that the sender is authorized and forwards the communication to the recipient. When a subsequent communication sent from the sender to the recipient is received, the authorization system may automatically determine that the sender is authorized and forward the communication to the recipient without re-contacting the sender. The authorization system may authorize the sender to send communications only to that recipient. Thus, the sender would need to go through a similar authorization process for each recipient. In this way, the authorization system can authorize senders without bothering the recipient and ensure that an inadvertently authorized sender is not authorized to send to all recipients.

Alternatively, the authorization system may not rely solely on the authorization information provided by the sender to determine whether the sender should be authorized to send communications to the recipient. The authorization system may automatically authorize senders based on other criteria such as their history of authorizations. For example, the authorization system may automatically authorize a sender when the sender has in the last month been successfully authorized using authorization information to communicate with five other recipients. As another example, the authorization system may automatically authorize a sender to send to all recipients in a certain category when one recipient in the category is authorized. The category could be, for example, recipients in the same e-mail domain, recipients in the same company, and so on. More generally, the authorization system may use a criteria that is based on an evaluation of whether the sender is likely to send unwanted communications. The authorization system may even revoke a sender's authorization in certain circumstances. One such circumstance may be when the sender sends communications to a large number of recipients (e.g., 10,000) in a short period of time. Another circumstance that may warrant revocation of a sender's authorization is if several recipients specifically request to revoke the authorization of that sender. In such circumstances, the authorization system may revoke the sender's authorization so that the sender is no longer authorized to send to any recipients. In another circumstance, the authorization system may automatically revoke a sender's authorization on a per-recipient basis.

One skilled in the art will appreciate that the techniques of the authorization system can be used in many different communications environments. In the following, an embodiment of the authorization system is described in an e-mail environment. The techniques of the authorization system may also be used to authorize telephone communications, voice mail communications, instant messaging communications, pager communications, and various other types of electronic communications. For example, an embodiment of the authorization system may intercept telephone calls placed by a sender (i.e., the caller) to a recipient (i.e., the callee). If the sender's telephone number is not on an authorized sender list for the recipient, then the authorization system may answer the call and request that the sender go to a certain web site and provide authorization information. If the sender provides the correct authorization information, then the next time the sender places a call to the recipient the call will automatically be authorized. The techniques may also be used to authorize non-electronic communications such as postal mail. For example, an embodiment of the authorization service may be used by a postal service to determine whether the sender (e.g., return addressee) is authorized to send postal mail to the recipient (e.g., addressee). If not, the postal service may send a postcard to the return address asking that the sender contact a web site and perform a similar authorization as described above for a telephone call. When that authorization is complete, the postal service may forward the postal mail to the recipient.

Figure 2:
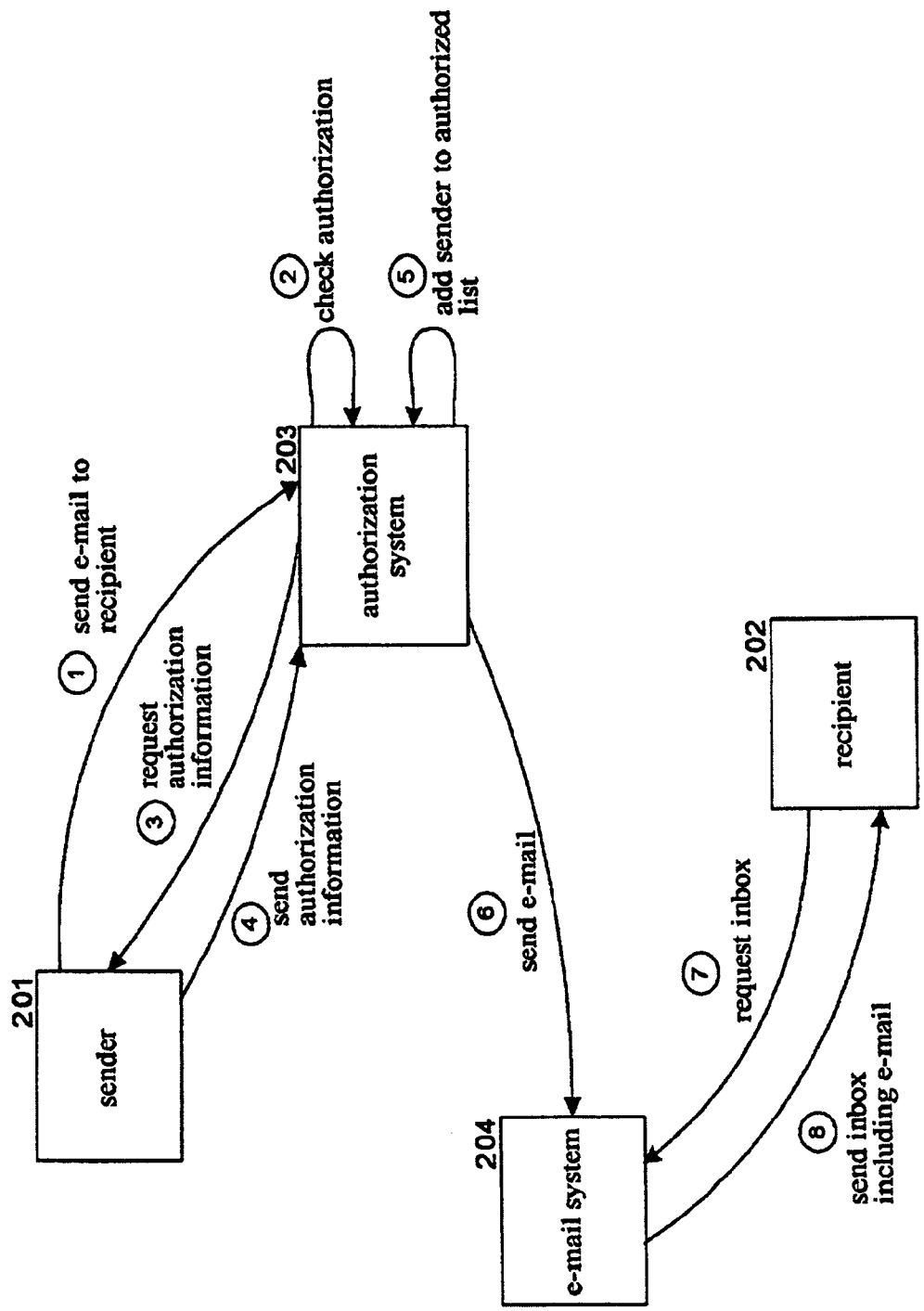
FIG. 2 is a block diagram illustrating a configuration of the authorization system implemented to authorize e-mail before being sent to an existing e-mail system.

The authorization system when used to authorize e-mail may be implemented in various different configurations. For example, the authorization system may be implemented as part of the e-mail system itself. In such a configuration, the e-mail system may invoke an authorization module or component when each e-mail message is received for a recipient who has requested that their e-mail be verified. As another example, the authorization system can be configured to work in conjunction with an existing e-mail system by routing e-mail to the authorization system first rather than directly to the e-mail server. FIGS. 1–3 illustrate example configurations of the authorization system.

FIG. 1 is a block diagram illustrating a configuration of the authorization system implemented as part of an e-mail system. The authorization system may be implemented as a component of an e-mail system. The e-mail system invokes the authorization system when it receives an e-mail message. If the authorization system determines that the sender is authorized to send to the recipient, then the authorization system may place the e-mail message in the recipient's inbox. Otherwise, the authorization system verifies whether the sender is authorized. The arrows indicate the sequence of steps that are performed when an e-mail message is sent to a recipient. Initially, a sender computer 101 sends an e-mail message in step 1 to the recipient. The e-mail system 103 receives the e-mail message and invokes the authorization system. The authorization system checks its internal tables in step 2 to determine whether the sender has already been authorized to send e-mail to the recipient. If authorized, then the e-mail message is placed in the recipient's inbox. If not authorized, then the authorization system sends a request for authorization information in step 3 to the sender. The request may be sent via an e-mail message that contains a link to a web page through which the sender can submit the authorization information. When the sender selects the link, the sender is provided with an authorization web page and provides the authorization information in step 4. Alternatively, the web page can be embedded in the e-mail message, rather than embedding just the link to the web page. The authorization information may alternatively be provided in ways other than accessing a web page. For example, the sender may be directed to provide the authorization information in a reply e-mail message or in a telephone call. When the authorization system receives the authorization information, it determines whether the authorization information is correct. If correct, the authorization system adds the sender in step 5 to a list of senders who are authorized to send e-mail to the recipient and then places the e-mail message in the recipient's inbox. The recipient may then use a recipient computer 102 to request their inbox in step 6 from the e-mail system. The e-mail system then sends to the recipient computer in step 7 the inbox information including the e-mail message sent from the sender. The authorization system may provide a service through which a recipient can access their e-mail messages that could not be authorized. The service may be implemented as part of the e-mail system or may be provided by a web site. That service may allow the recipient to view the e-mail messages and indicate which senders should be authorized. Alternatively, the authorization system may place e-mail messages that cannot be authorized in a special e-mail folder.

FIG. 2 is a block diagram illustrating a configuration of the authorization system implemented to authorize e-mail before being sent to an existing e-mail system. The recipient's e-mail is routed from a sender computer 201 to the authorization system 203 rather than to the existing e-mail system 204. The authorization system then authorizes the e-mail message and forwards it to the existing e-mail system for processing as normal. If the sender cannot be authorized, then the authorization system may store the e-mail message for access by the recipient via a web page or some other mechanism. The sender computer sends an e-mail message in a step 1 to the recipient. The authorization system receives the e-mail message and checks in step 2 whether the sender is authorized to send e-mail to the recipient. If authorized, then the authorization system sends the e-mail message to the existing e-mail system. If not authorized, then the authorization system requests authorization information in step 3 from the sender. The sender provides the authorization information in step 4 to the authorization system. If the authorization information is correct, then the authorization system adds the sender in step 5 to a list of senders who are authorized to send e-mail to the recipient. The authorization system then sends the e-mail message in step 6 to the existing e-mail system. The recipient then may use a recipient computer 202 to request their inbox in step 7 from the existing e-mail system. In response, the existing e-mail system sends in step 8 the inbox including the e-mail message to the recipient computer.

Figure 3A:
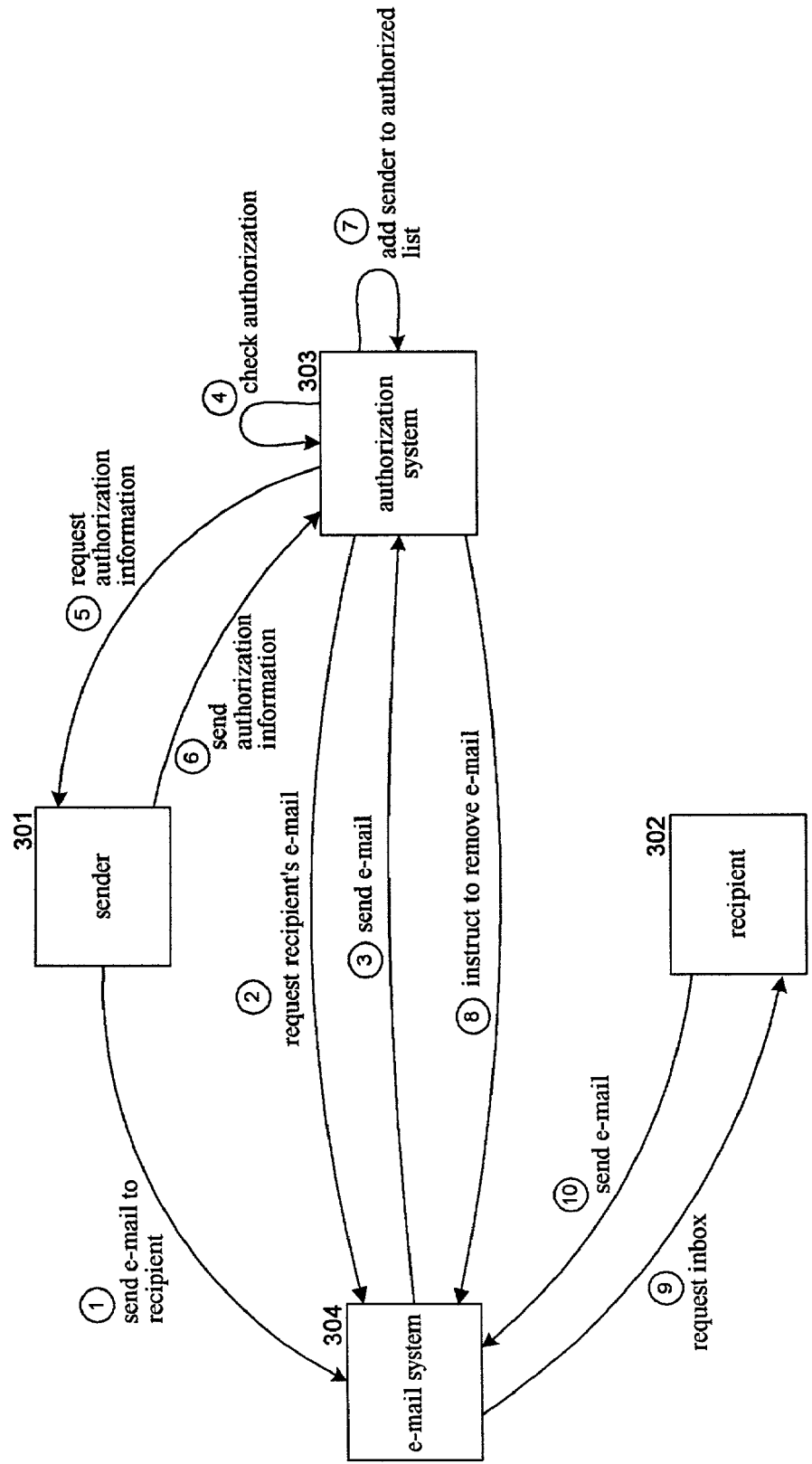
FIG. 3A is a block diagram illustrating a configuration of the authorization system implemented to retrieve e-mail messages delivered to an existing e-mail system.

FIG. 3A is a block diagram illustrating a configuration of the authorization system implemented to retrieve e-mail messages delivered to an existing e-mail system. The authorization system 303 may have the e-mail authentication information (e.g., account name and password) of the recipient for an existing e-mail system 304. The authorization system periodically checks the inbox of the recipient and determines whether any e-mail messages from unauthorized recipients have been received. Alternatively, rather than periodically checking the inbox of the recipient, the recipient's inbox may be configured to automatically forward all e-mail messages to the authorization system using, for example, an inbox assistant. If the authorization system cannot authorize the sender, then the authorization system may automatically delete the e-mail message from the recipient's inbox. A sender computer 301 initially sends an e-mail message in step 1 to the recipient. The e-mail message is routed to the existing e-mail system. Periodically the authorization system requests the recipient's e-mail messages in step 2 from the existing e-mail system. The existing e-mail system sends the e-mail messages in step 3 to the authorization system. In one embodiment, the e-mail system need only send the identifications of the senders. The authorization system then checks the authorization of the sender in step 4. If the sender is authorized, the authorization system leaves the e-mail message in the recipient's inbox. If, however, the sender is not currently authorized, then the authorization system requests authorization information in step 5 from the sender. During this authorization process, the authorization system may move the e-mail message to an e-mail folder for unauthorized senders. When the sender is authorized, then the authorization system would move the e-mail message back to the inbox. The sender then provides the authorization information in step 6 to the authorization system. The authorization system verifies the correctness of the authorization information and adds the sender in step 7 to the list of senders who are authorized to send e-mail to the recipient. If the authorization system cannot authorize the sender, then the authorization system instructs the existing e-mail system in step 8 to remove the e-mail message from the inbox. Otherwise, the e-mail message is left in the inbox. When the recipient requests their inbox in step 9, the existing e-mail system provides the inbox including the authorized e-mail message in step 10 to a recipient computer 302.

Figure 3B:
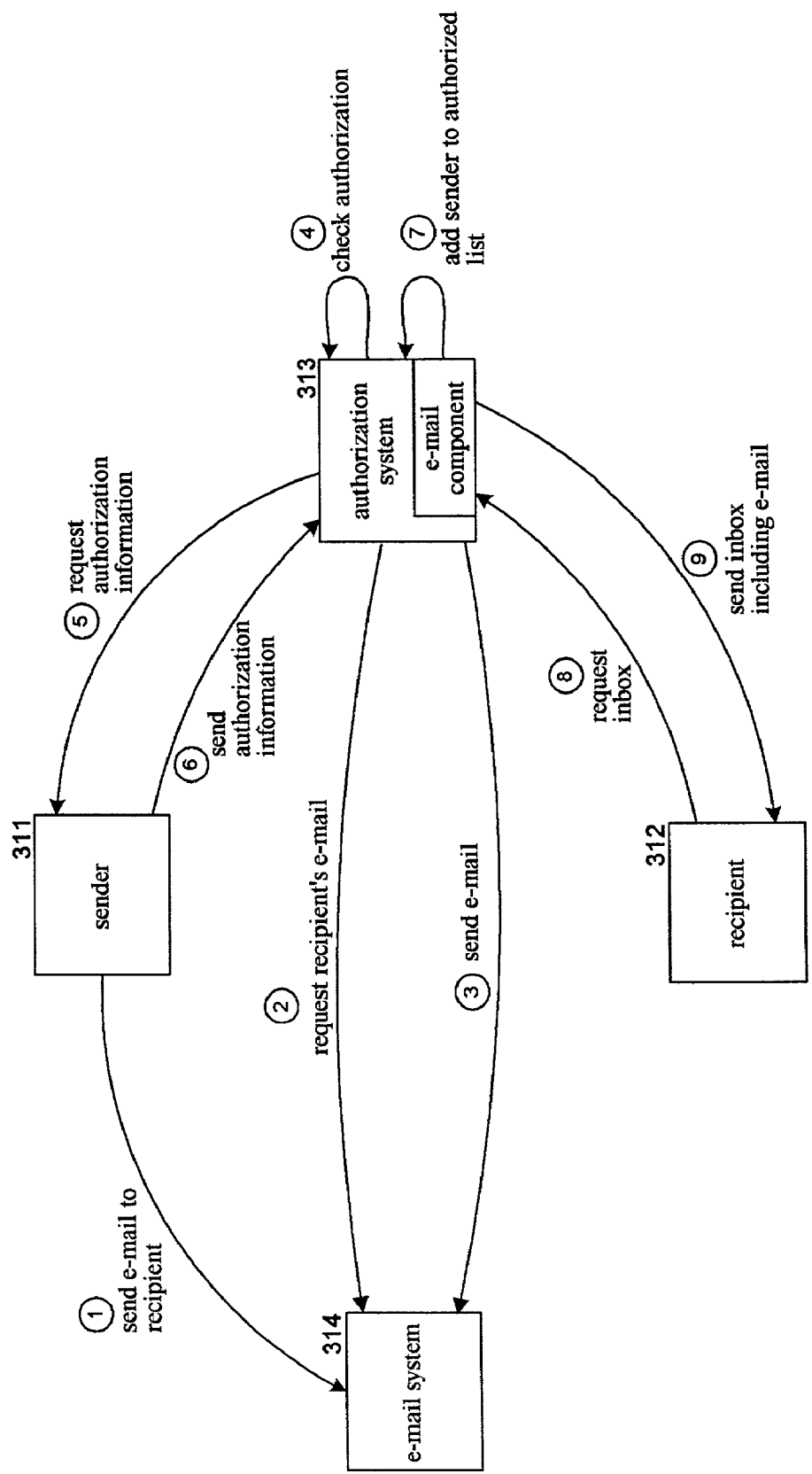
FIG. 3B is a block diagram illustrating a configuration of the authorization system implemented to retrieve e-mail messages delivered to an existing e-mail system and provide the authorized e-mail messages via an e-mail component of the authorization system.

FIG. 3B is a block diagram illustrating a configuration of the authorization system implemented to retrieve e-mail messages delivered to an existing e-mail system and provide the authorized e-mail messages via an e-mail component of the authorization system. This configuration is a hybrid of the configurations of FIG. 1 and FIG. 3A. This configuration provides an e-mail component like the configuration of FIG. 1, but the e-mail messages are sent initially to an existing e-mail system. This configuration retrieves the e-mail messages from the existing e-mail system like the configuration of FIG. 3A, but the e-mail messages are provided to the recipient via the authorization system, rather than via the existing e-mail system. A sender computer 311 initially sends an e-mail message in step 1 to the recipient. The e-mail message is routed to an existing e-mail system 314. Periodically the authorization system 313 requests the recipient's e-mail messages in step 2 from the existing e-mail system. The existing e-mail system sends the e-mail messages in step 3 to the authorization system. The authorization system then checks the authorization of the sender in step 4. If the sender is authorized, the authorization system stores the e-mail message in the recipient's inbox of the e-mail component of the authorization system. If, however, the sender is not currently authorized, then the authorization system requests authorization information in step 5 from the sender. The sender then provides the authorization information in step 6 to the authorization system. The authorization system verifies the correctness of the authorization information and adds the sender in step 7 to the list of senders who are authorized to send e-mail to the recipient. If the sender is authorized, the authorization system stores the e-mail message in the recipient's inbox of the e-mail component of the authorization system. If the authorization system, however, cannot authorize the sender, then the authorization system may store the e-mail message in a folder for e-mail messages from unauthorized senders. When the recipient requests their inbox in step 8, the e-mail component of the authorization system provides the inbox including the authorized e-mail message in step 9 to a recipient computer 312.

Figure 4:
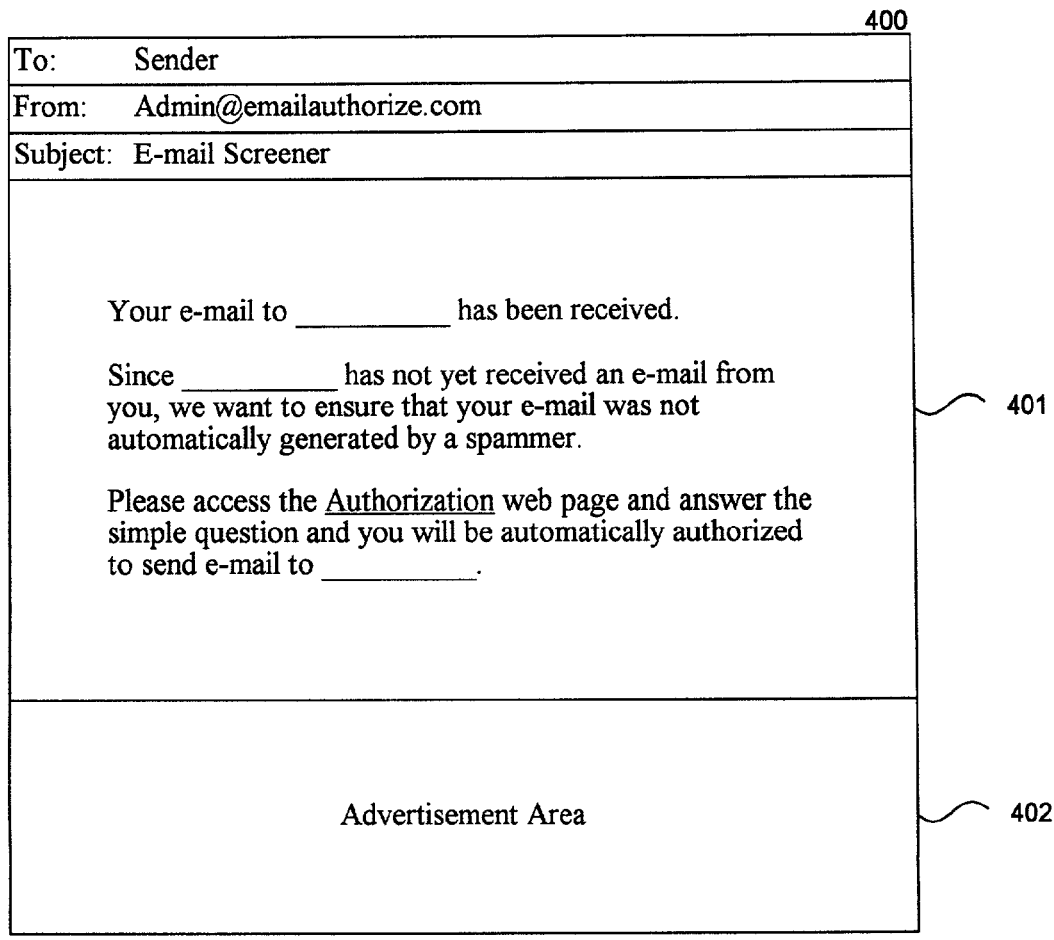
FIG. 4 illustrates an authorization e-mail message that is sent to a sender from the authorization system.

FIGS. 4–9 illustrate communications between a sender and the authorization system in one embodiment. FIG. 4 illustrates an authorization e-mail message that is sent to a sender from the authorization system. An authorization e-mail message requests the sender to provide certain authorization information. The e-mail message 400 includes message area 401 and advertisement area 402. The message area identifies the reason for the e-mail message and includes a link to a web page through which the sender can provide the authorization information. The advertisement area may include any advertisement provided by the authorization system. For example, the authorization system may include advertisements of a third party to derive advertising revenue. The advertisement area may include links to web pages associated with the advertisement. The authorization e-mail message, rather than providing a link to a web page, may include the web page itself or may request the sender to reply to the e-mail message with the authorization information included, for example, in the subject line.

Figure 5:
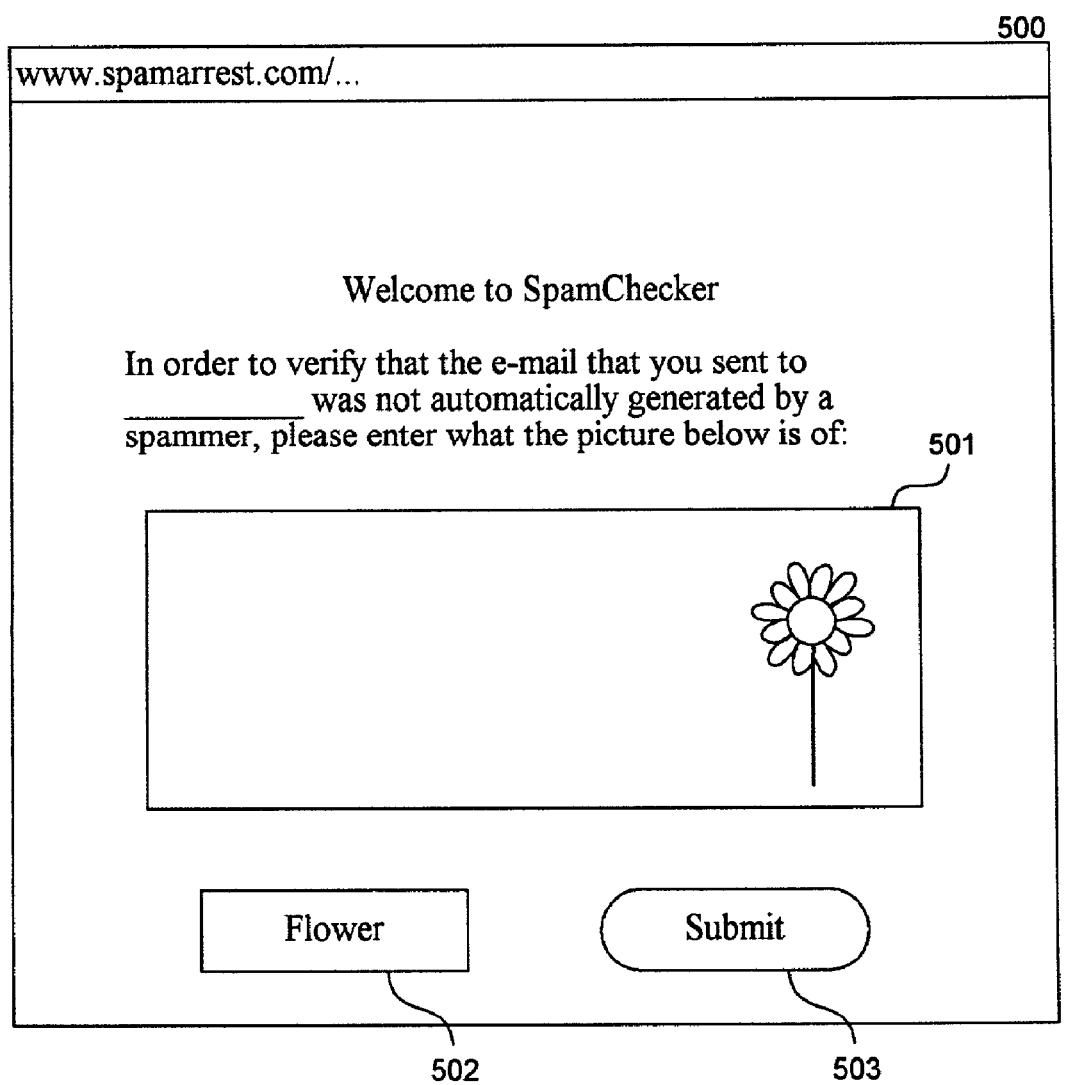
FIG. 5 illustrates a web page through which a sender provides authorization information.

FIG. 5 illustrates a web page through which a sender provides authorization information. The web page 500 is provided to the sender when the sender selects the link included in an authorization e-mail message. The web page includes a request for authorization information. In this example, the sender is requested to identify the picture 501. The user enters "flower" into data entry field 502 and then selects the submit button 503. When the submit button is selected, then the content of the data entry field and an identifier of the e-mail message being authorized is sent to the authorization system. The authorization system may send requests for many different types of authorization information (e.g., ask many different questions) to make it difficult for a computer to automatically provide the correct authorization information. A test for detecting whether a respondent is a person or computer is known as a "Turing test." Well-known Turing tests include asking the respondent to identify a semantic error in a sentence, to identify a word that is shown in an image with its letters distorted, or to identify a word that is presented audibly. Nevertheless, even if a spamming computer was able to provide the correct authorization information in one instance, then the sender would be authorized to send to that recipient, but not automatically authorized to send to other recipients.

FIG. 6 illustrates a web page notifying the sender that they have been authorized. Web page 600 indicates that the e-mail message will be forwarded to the recipient and that future e-mail message will be automatically forwarded to that recipient. The web page may also invite the sender to sign up to use the authorization service of the authorization system. FIG. 7 illustrates a web page for signing up for the authorization service. In one embodiment, the authorization system may be integrated with an e-mail system. When a user signs up for the e-mail system, they may be automatically signed up for the authorization service. Alternatively, the e-mail system may allow each member to decide if they want to sign up for authorization service. Web page 700 requests that the user provide their e-mail name and password for the new e-mail account.

Figure 8:
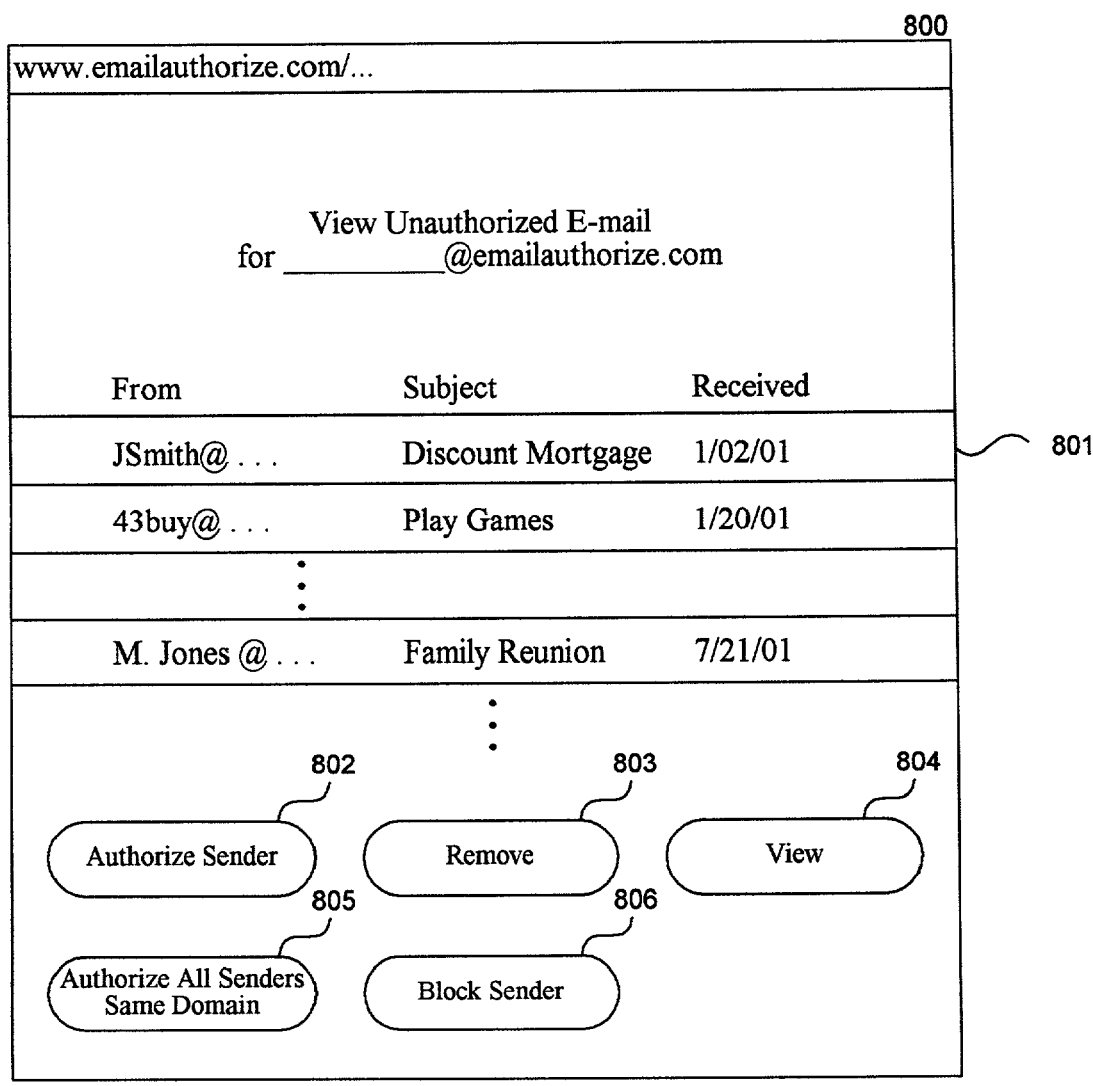
FIG. 8 illustrates a web page that a recipient may use to view unauthorized e-mail messages.

FIG. 8 illustrates a web page that a recipient may use to view unauthorized e-mail messages. The user provides their e-mail name and password to gain access to a web portion of the authorization system. Web page 800 includes a list 801 of the unauthorized e-mail messages that were sent to the user and could not be authorized. The authorization system may allow the user to select and view the contents of the e-mail messages. The buttons 802–806 at the bottom of the web page allow the user to indicate that the sender of the selected e-mail message is to be automatically authorized, that the e-mail message is to be removed, that the e-mail message is to be viewed, that all senders of the same domain as the sender of the e-mail message are to be automatically authorized, or that the sender is to be blocked (i.e., e-mail from that sender will automatically be deleted without attempting to authorize the sender). A recipient who is an employee of a company may want, for example, to automatically authorize all employees of the same company to send e-mail messages.

Figure 9:
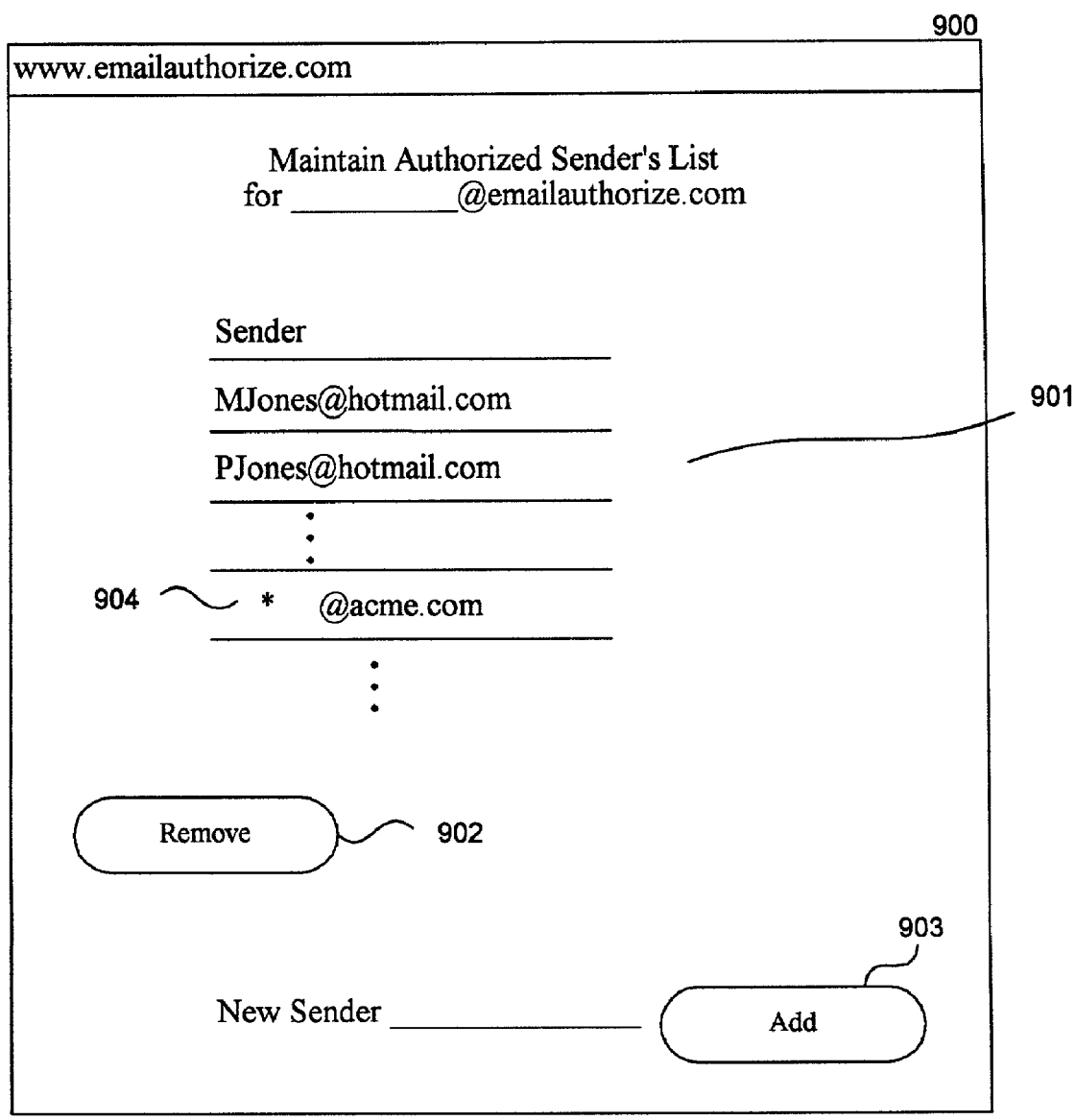
FIG. 9 illustrates a web page that a recipient may use to view their list of authorized senders.

FIG. 9 illustrates a web page that a recipient may use to view their list of authorized senders. Web page 900 includes a list 901 of senders who are currently authorized to send e-mail to the recipient. The recipient may use the remove button 902 to remove a sender from the list and may use the add button 903 to add a new sender to list. The asterisk 904 indicates that all senders from the domain "Acme.com" are authorized to send to the recipient. In one embodiment, the authorization system may allow a recipient to maintain a list of senders whose e-mail is to be blocked.

Figure 10:
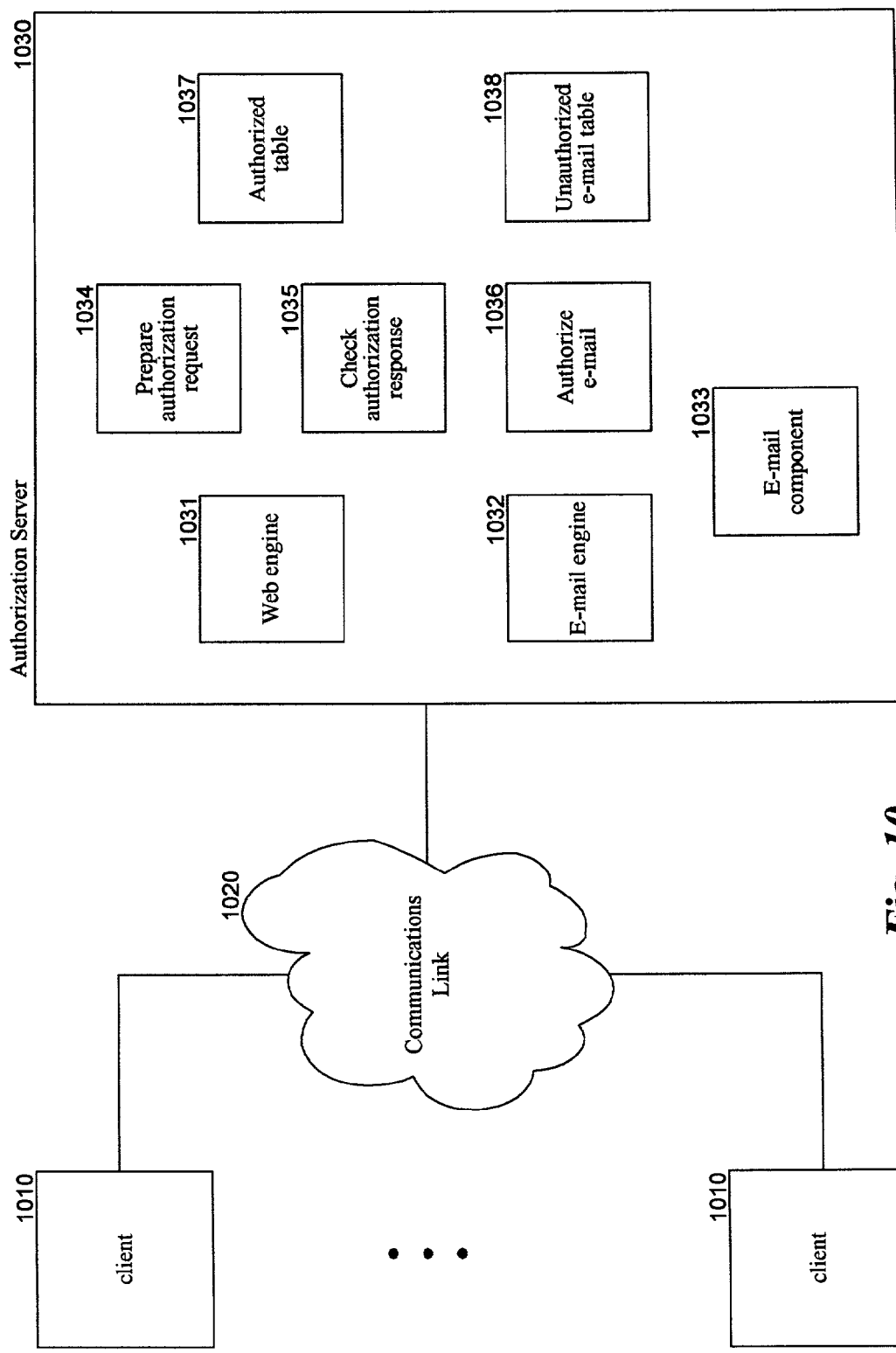
FIG. 10 is a block diagram illustrating components of the authorization system in one embodiment.

FIG. 10 is a block diagram illustrating components of the authorization system in one embodiment. The client computers 1010 are connected via communications link 1020 to the authorization server 1030. In this example, the authorization system is configured as a component of an e-mail system. The authorization server includes an e-mail subsystem and a web subsystem. The e-mail subsystem provides standard e-mail capabilities along with the authorization of e-mail messages. The web subsystem allows senders to provide authorization information and recipients to view and modify their authorization information. The authorization server includes a web engine 1030, an e-mail engine 1032, an e-mail component 1033, a prepare authorization request component 1034, a check authorization response component 1035, an authorize e-mail component 1036, an authorized sender table 1037, and an unauthorized e-mail table 1038. The e-mail engine receives e-mail messages directed to the users of the e-mail system. The e-mail engine routes the received e-mail messages to the authorize e-mail component. The authorize e-mail component determines whether the sender is authorized and, if so, forwards the e-mail message to the e-mail component. If the sender is not currently authorized to send e-mail to the recipient as indicated by the authorized sender table, then the authorize e-mail component sends a request for authorization information via e-mail to the sender. The authorization e-mail message may contain a link to a web page through which the sender provides the authorization information. That link may also identify the sender and recipient so that the authorization server can determine the e-mail message that is being authorized. When the sender selects the link in the authorization e-mail message, the web engine receives the request and invokes the prepare authorization request web page component to prepare the authorization web page. The web engine forwards the web page to the sender. When the sender provides the authorization response, the web engine routes the information to the check authorization response component. The check authorization response component determines whether the authorization response is correct and, if so, adds the sender to the list of authorized senders for that recipient in the authorized sender table. The authorization server also includes components (not shown) for accessing unauthorized e-mail messages of recipients. The computers of the authorization system may include a central processing unit, memory, input devices (e.g., keyboard and pointing devices), output devices (e.g., display devices), and storage devices (e.g., disk drives). The memory and storage devices are computer-readable media that may contain instructions that implement the authorization system. In addition, the data structures and message structures may be stored or transmitted via a data transmission medium, such as a signal on a communications link. Various communications links can be used, such as the Internet, a local area network, a wide area network, or a point-to-point dial-up connection.

Figure 11:
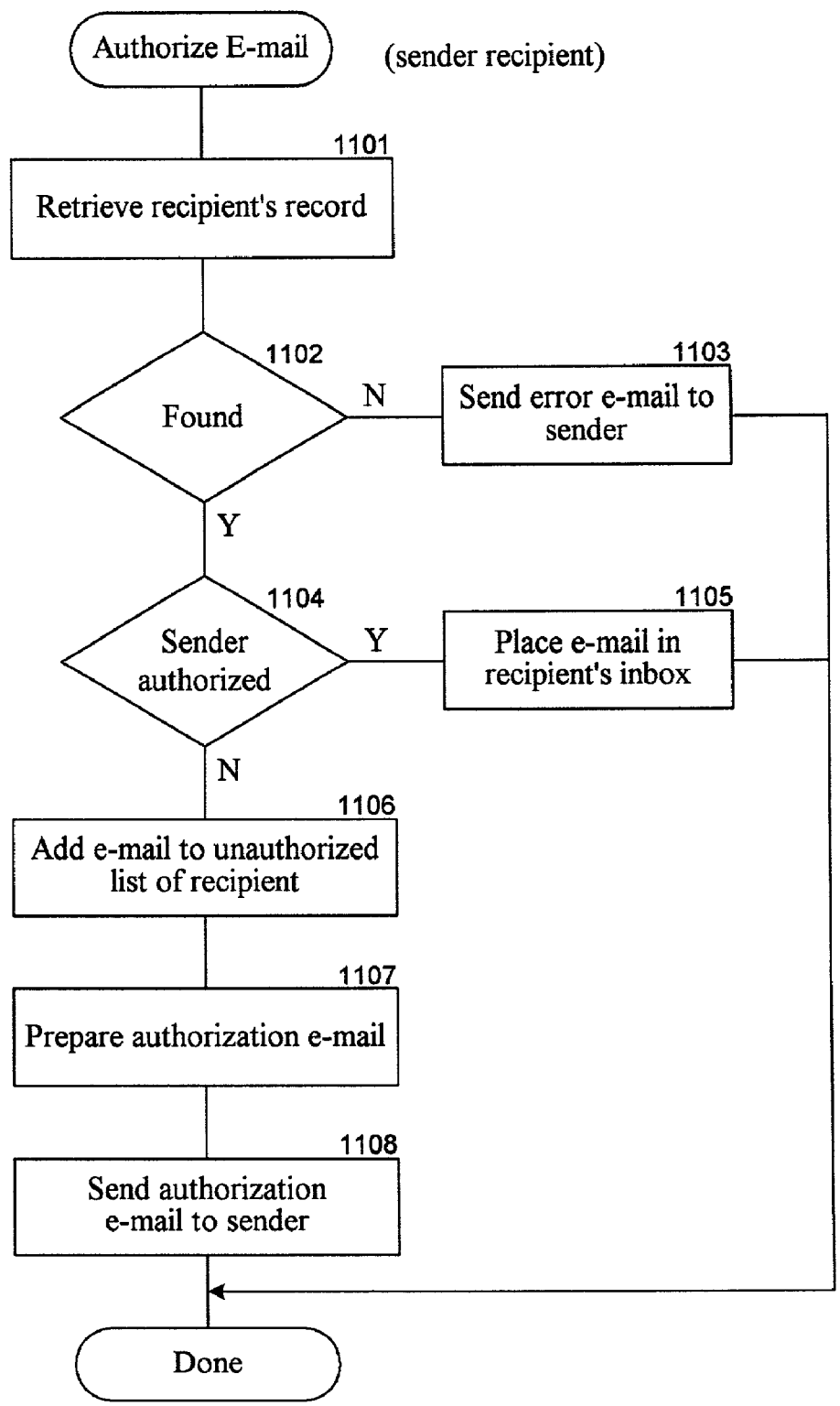
FIG. 11 is a flow diagram illustrating processing of the authorize e-mail component in one embodiment.

FIG. 11 is a flow diagram illustrating processing of the authorize e-mail component in one embodiment. The authorize e-mail component is provided with an indication of a sender and a recipient. It checks the authorized sender table to determine whether the sender is authorized to send to that recipient. If not, the component attempts to authorize the sender. In block 1101, the component retrieves the recipient's list of authorized senders from the authorized sender table. In decision block 1102, if the list is found, then the component continues at block 1104, else the component continues at block 1103. In block 1103, the component sends an error e-mail message to the sender indicating that the recipient does not exist in the authorization system and then completes. In decision block 1104, if the sender is in the list of authorized senders for the recipient, then the component continues at block 1105, else the component continues at block 1106. In block 1105, the component places the e-mail message in the recipient's inbox and completes. In block 1106, the component adds the e-mail message to the unauthorized list of e-mail messages for the recipient. The component may also place the e-mail message in a folder of the recipient for holding unauthorized e-mail messages. In block 1107, the component prepares an authorization e-mail message and sends it into the sender. The authorization e-mail message may include a link to a web page along with a unique identifier so that the authorization system can identify the unauthorized e-mail message that is to be authorized when the sender selects the link. In block 1108, the component sends the authorization e-mail message to the sender and then completes.

Figure 12:
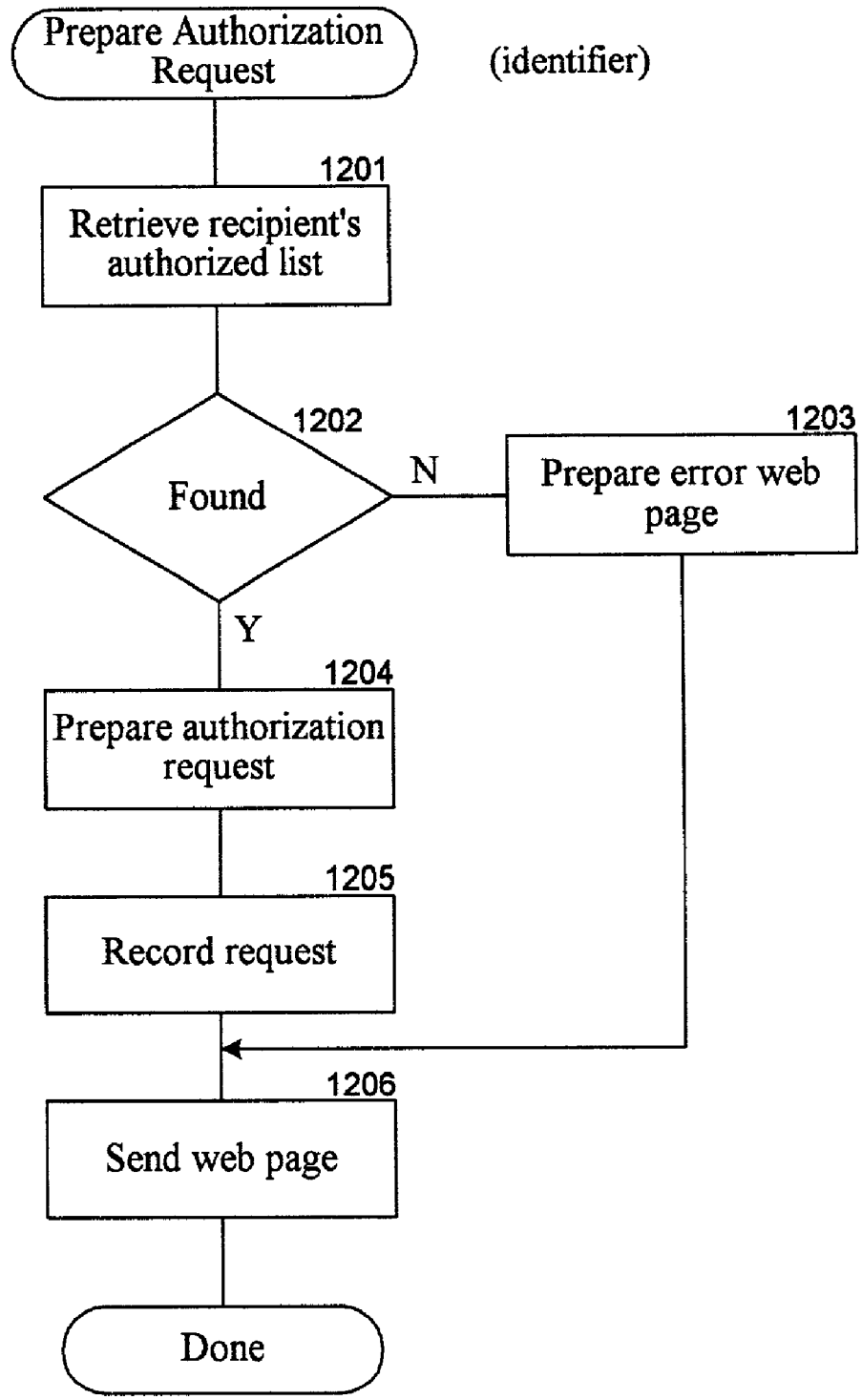
FIG. 12 is a flow diagram illustrating process of the prepare authorization request component in one embodiment.

FIG. 12 is a flow diagram illustrating processing of the prepare the authorization request component in one embodiment. This component is passed an e-mail message identifier so that it can identify the e-mail message to be authorized. The component then prepares and sends the authorization web page. In block 1201, the component retrieves the identified e-mail message. In decision block 1202, if the e-mail message is retrieved, then the component continues at block 1204, else the component continues at block 1203. In block 1203, the component prepares an error web page and continues at block 1206. If there is no e-mail message corresponding to the identifier, then the authorization system may have already determined whether the sender was authorized. In block 1204, the component prepares an authorization web page with an authorization request. In block 1205, the component may record the authorization request so that it can determine whether the response is correct. In block 1206, the component provides the prepared web page to the sender and then completes.

Figure 13:
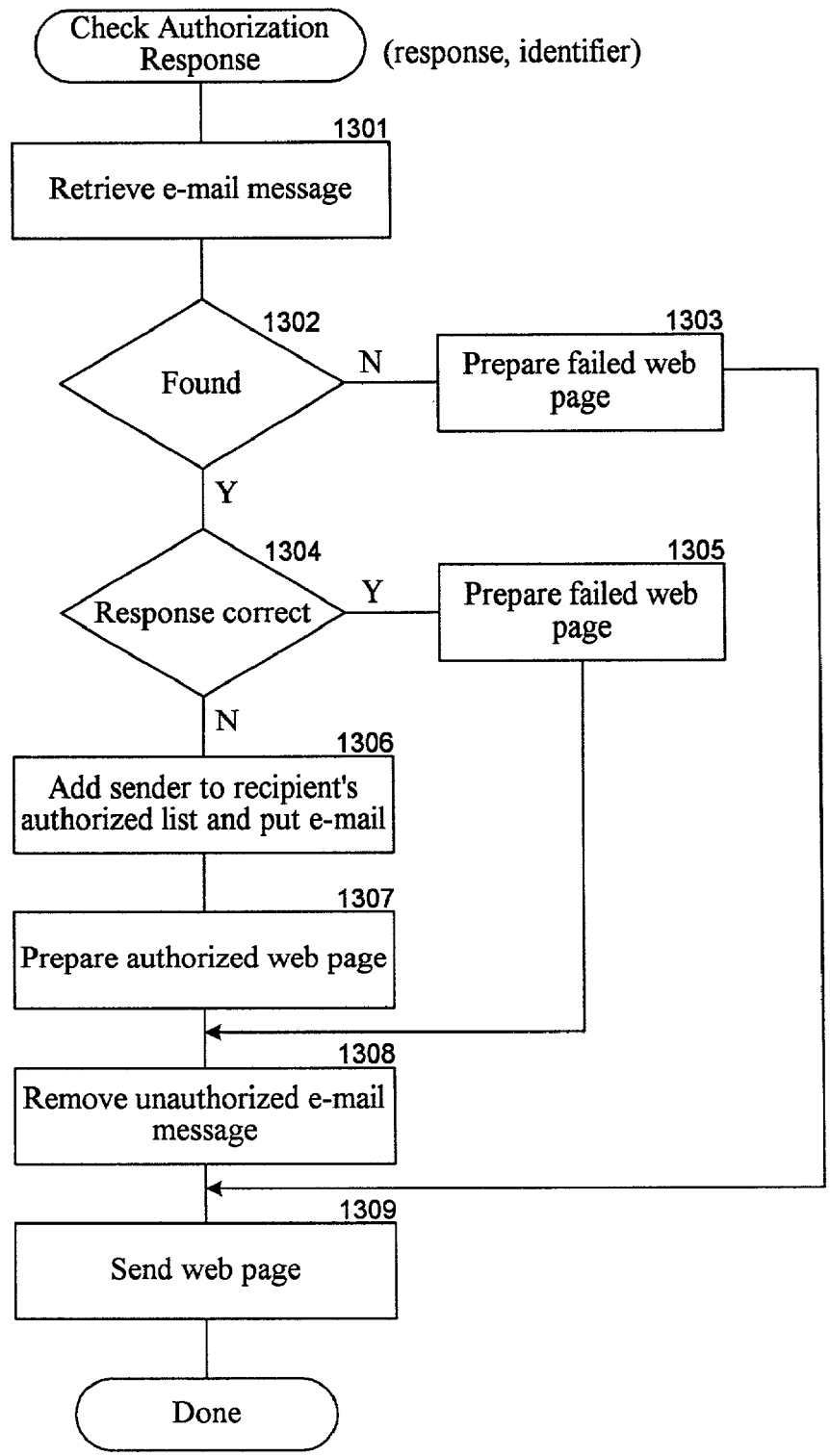
FIG. 13 is a flow diagram illustrating processing of the check authorization response component in one embodiment.

FIG. 13 is a flow diagram illustrating processing of the check authorization response component in one embodiment. The component receives the authorization response and the identifier of the e-mail message. The component determines whether the sender is authorized based on the response. In block 1301, the component retrieves the identified e-mail message and recorded authorization request. In decision block 1302, if retrieved, then the component continues at block 1304, else the component continues at block 1303. In block 1303, the component prepares a failed web page message and then continues at block 1309. In decision block 1304, if the authorization response is correct, then the component continues at block 1306, else the component continues at block 1305. In block 1305, the component prepares a failed web page message and then continues at block 1308. In block 1306, the component adds the sender to the list of authorized senders for the recipient and places the e-mail message in the recipient's inbox. In block 1307, the component prepares the authorized web page. In block 1308, the component removes the unauthorized e-mail message from the unauthorized e-mail table and as appropriate from the recipient's unauthorized e-mail folder. In block 1309, the component sends the prepared web page and then completes.

From the foregoing, it will be appreciated that specific embodiments of the invention have been described herein for purposes of illustration, but that various modifications may be made without deviating from the spirit and scope of the invention. For example, the requested authorization information can be any type of information that may satisfy the authorization needs of recipients. In one instance, the authorization system may request the sender to provide some personal information of the recipient such as place of employment, place of residence, secret code provided by the recipient, and so on. Also, the authorization system may use a characteristic of the communication or sender when determining whether to authorize the sender. For example, the authorization system may decide not to authorize a sender when the communication has an executable attachment or may require additional authorization information from the sender before authorizing the sender. The authorization system may also use personal information about the sender that it may derive from various source in deciding whether to authorize the recipient. For example, the authorization system may rely on the country of citizenship of the sender, the FBI'S 10-Most Wanted List, and so on. The authorization system may also save e-mail messages from unauthorized senders and provide them to the recipient when the sender is eventually authorized. In one embodiment, the authorization system may periodically (e.g., monthly) send an e-mail message with advertisements to each recipient. In such an embodiment, the authorization service may be provided free of charge to the recipients as the revenue from the advertisements may be sufficient to offset the costs of the advertisement. A recipient for a fee may request not to receive the e-mail messages with the advertisements. Accordingly, the invention is not limited except as by the appended claims.

We claim:

1. A method for authorizing communications, the method comprising:

receiving a communication sent from a sender to a recipient;

sending an authorization communication to the sender, the authorization communication requesting authorization information from the sender to determine whether the sender should be authorized to send communications to the recipient;

in response to sending the authorization communication to the sender, receiving from the sender authorization information; and if the received authorization information indicates that the sender is authorized:

providing the received communication to the recipient;

designating the sender as authorized to send communications to the recipient; and if another recipient requests to revoke the authorization of the sender, revoking the authorization of the sender to send communications to the recipient.

2. A computer-readable medium having computer-executable instructions for performing the method of claim 1.

3. The method of claim 1 wherein the communications are electronic mail messages.

4. The method of claim 3 wherein the providing of the received communication to the recipient includes placing the received communication in an inbox of the recipient.

5. The method of claim 1 wherein the authorization communication includes a link to a display page through which the sender provides the authorization information.

6. The method of claim 1 wherein communications are electronic mail messages and the sender provides the authorization information in an electronic mail message.

7. The method of claim 1 wherein the authorization information includes a response to instructions, the instructions being designed to make it difficult for an automated system to provide an appropriate response.

8. The method of claim 1 including before sending an authorization communication to the sender, determining whether the sender is already authorized to send communications to the recipient and when authorized, providing the received communication to the recipient.

9. The method of claim 1 including when the received authorization information indicates that the sender is authorized, recording an indication so that subsequent communications sent from the sender to the recipient can be provided to the recipient without receiving additional authorization information from the sender.

10. The method of claim 9 wherein the recorded indication only indicates that the sender is authorized to send to that recipient.

11. The method of claim 9 including receiving from the recipient an indication of senders that are authorized to send communications to the recipient.

12. The method of claim 9 including receiving from the recipient an indication of senders that are no longer authorized to send communications to the recipient.

13. The method of claim 1 wherein a sender is requested to provide authorization information for each different recipient to whom the sender sends a communication.

14. The method of claim 1 wherein the authorization communication include an authorization identifier for identifying the received communication.

15. The method of claim 1 including notifying a recipient of received communications that have not been authorized.

16. The method of claim 1 including periodically sending to the recipient a communication that includes advertisements.

17. The method of claim 16 including suppressing the sending of the communication that includes advertisements to recipients who meet a certain criterion.

18. The method of claim 17 wherein the criterion is enrollment in a no-solicitation service.

19. The method of claim 1 wherein when the received authorization information indicates that the sender is not authorized, providing the received communication to the recipient with an indication that it was sent by a sender who could not be authorized.

20. The method of claim 19 wherein the indication is placing authorized and not authorized communication in separate folders.

21. The method of claim 1 wherein the receiving includes using a recipient identification and password to retrieve the communication from an electronic mail account of the recipient.

22. The method of claim 21 wherein the communication is retrieved from an inbox.

23. The method of claim 22 wherein the providing includes leaving the retrieved communication in the inbox.

24. The method of claim 22 including when the received authorization information indicates that the sender is not authorized, removing the communication from the inbox.

25. The method of claim 22 including when the received authorization information indicates that the sender is not authorized, moving the communication to a folder different from the inbox.

26. The method of claim 1 wherein the authorization communication includes a web page through which the sender provides the authorization information.

27. An authorization system for authorizing senders to send communications to recipients, the system comprising:
  a component that receives a communication sent from a sender to a recipient;
  a component that determines whether the sender of the received communication is authorized to send communications to the recipient;
  a component that attempts to authorize the sender when it is determined that the sender is not authorized by requesting authorization information from the sender, by receiving authorization information from the sender, and by determining whether the authorization information indicates that the sender should be authorized;
  a component that provides the communication to the recipient when it is determined that the sender is authorized to send the communication to the recipient; and
  a component for determining whether the sender is authorized based on other recipients for whom the sender is authorized to send communications.

28. The authorization system of claim 27 wherein the authorization system is a subsystem of an electronic mail system.

29. The authorization system of claim 28 wherein the electronic mail system receives the communication and invokes the authorization system to determine whether the sender is authorized.

30. The authorization system of claim 27 wherein the authorization system is separate from an electronic mail system.

31. The authorization system of claim 30 wherein the authorization system receives the communication from the sender and wherein the authorization system sends the communication to the electronic mail system when it determines that the sender is authorized.

32. The authorization system of claim 30 wherein the authorization system receives the communication from the sender and wherein when the sender cannot be authorized, the authorization system sends the communication to a folder of the electronic mail system designated for communications of the recipient from senders that is not authorized.

33. The authorization system of claim 30 wherein the electronic mail system receives the communication from the sender, wherein the authorization system retrieves the communication from the electronic mail system, and wherein the authorization system indicates to the electronic mail system whether the sender is authorized.

34. The authorization system of claim 33 wherein the authorization system indicates that the sender is authorized by leaving the communication in an inbox of the recipient.

35. The authorization system of claim 33 wherein the authorization system indicates that the sender is not authorized by removing the communication from the inbox of the recipient.

36. The authorization system of claim 35 wherein the authorization system adds the removed communication to a folder of the recipient for communications of senders who are not authorized.

37. The authorization system of claim 33 wherein the authorization system retrieves the communication from the electronic mail system as a result of the electronic mail system automatically forwarding communications of the recipient to the authorization system.

38. The authorization system of claim 27 wherein the authorization system includes an electronic mail component, wherein the authorization system retrieves the communication from an electronic mail system, wherein the authorization system determines whether the sender is authorized, and wherein when the sender is authorized, the authorization system makes the communication available to the recipient through its electronic mail component.

39. The authorization system of claim 38 wherein the authorization system retrieves the communication from the electronic mail system as a result of the electronic mail system automatically forwarding communications of the recipient to the authorization system.

40. The authorization system of claim 38 wherein the authorization system retrieves the communication from the electronic mail system using authentication information of the recipient.

41. The authorization system of claim 27 wherein the requesting of authorization information from the sender includes sending an electronic mail message to the sender.

42. The authorization system of claim 41 wherein the electronic mail message includes a link to a web page through which the sender provides the authorization information.

43. The authorization system of claim 41 wherein the electronic mail message includes a web page through which the sender provides the authorization information.

44. The authorization system of claim 41 wherein the sender provides the authorization information in an electronic mail message.

45. The authorization system of claim 27 wherein the requested authorization information is used to determine whether the sender is an automated system.

46. The authorization system of claim 27 wherein the requested authorization information is a Turing test.

47. The authorization system of claim 27 including when it is determined that the sender is authorized to send the communication to the recipient, designating the sender as authorized to send to the recipient so that the authorization system sends subsequent communications from the sender to the recipient without requesting authorization information from the recipient.

48. The authorization system of claim 47 including revoking the designation that a sender is authorized to send to the recipient based on a criterion.

49. The authorization system of claim 48 wherein the criterion is that the sender has sent communications to many other recipients in a short period of time.

50. The authorization system of claim 48 wherein the criterion is that other recipients have requested to revoke the authorization of that sender.

51. An authorization system for authorizing senders to send communications to recipients, the system comprising:
means for receiving a communication sent from a sender to a recipient;
means for determining whether the sender of the received communication is authorized to send communications to the recipient by requesting authorization information from the sender, by receiving authorization information from the sender, and by determining whether the authorization information indicates that the sender should be authorized;
means for providing the communication to the recipient when it is determined that the sender is authorized to send the communication to the recipient; and
means for revoking the authorization of the sender to send communications to the recipient if it is determined that another recipient has revoked a similar authorization.

52. The authorization system of claim 51 wherein the authorization system is a subsystem of an electronic mail system.

53. The authorization system of claim 52 wherein the electronic mail system receives the communication and invokes the authorization system to determine whether the sender is authorized.

54. The authorization system of claim 51 wherein the authorization system is separate from an electronic mail system.

55. The authorization system of claim 54 wherein the authorization system receives the communication from the sender and wherein the authorization system sends the communication to the electronic mail system when it determines that the sender is authorized.

56. The authorization system of claim 54 wherein the authorization system receives the communication from the sender and wherein when the sender cannot be authorized, the authorization system sends the communication to a folder of the electronic mail system designated for communications of the recipient from senders that cannot be authorized.

57. The authorization system of claim 54 wherein the electronic mail system receives the communication from the sender, wherein the authorization system retrieves the communication from the electronic mail system, and wherein the authorization system indicates to the electronic mail system whether the sender is authorized.

58. The authorization system of claim 57 wherein the authorization system indicates that the sender is authorized by leaving the communication in an inbox of the recipient.

59. The authorization system of claim 57 wherein the authorization system indicates that the sender is not authorized by removing the communication from the inbox of the recipient.

60. The authorization system of claim 57 wherein the authorization system retrieves the communication from the electronic mail system as a result of the electronic mail system automatically forwarding communications of the recipient to the authorization system.

61. The authorization system of claim 51 wherein the authorization system includes an electronic mail component, wherein the authorization system retrieves the communication from an electronic mail system, wherein the authorization system determines whether the sender is authorized, and wherein when the sender is authorized, the authorization system makes the communication available to the recipient through its electronic mail component.

62. The authorization system of claim 61 wherein the authorization system retrieves the communication from the electronic mail system as a result of the electronic mail system automatically forwarding communications of the recipient to the authorization system.

63. The authorization system of claim 61 wherein the authorization system retrieves the communication from the electronic mail system using authentication information of the recipient.

* * * * *